May 8, 1923.
G. T. CHERINGTON
1,454,625
GEAR TRAIN FOR PHONOGRAPH MOTORS
Filed April 9, 1920   2 Sheets-Sheet 1
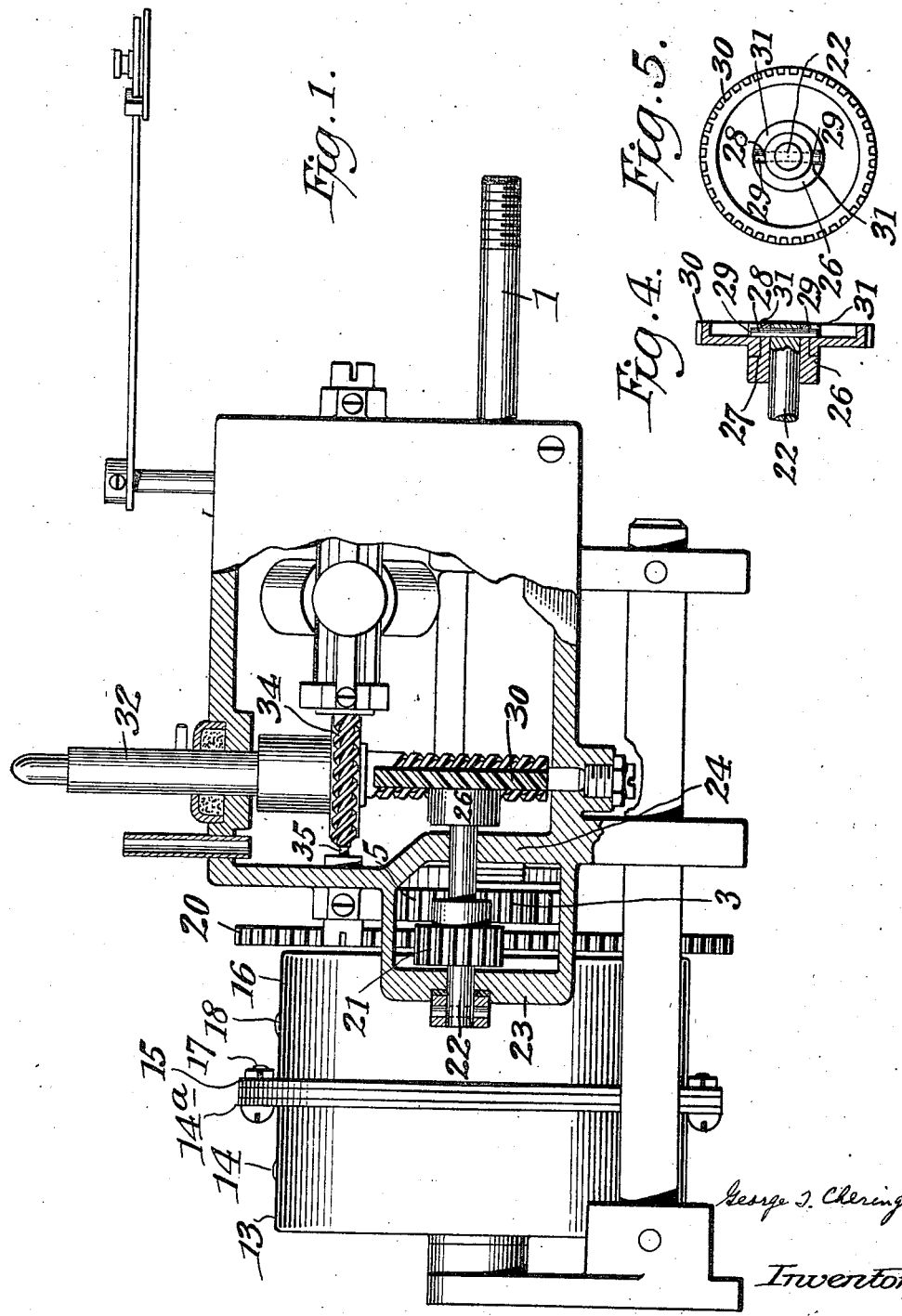
George T. Cherington
Inventor;
BY Dodson & Rae Attorneys.

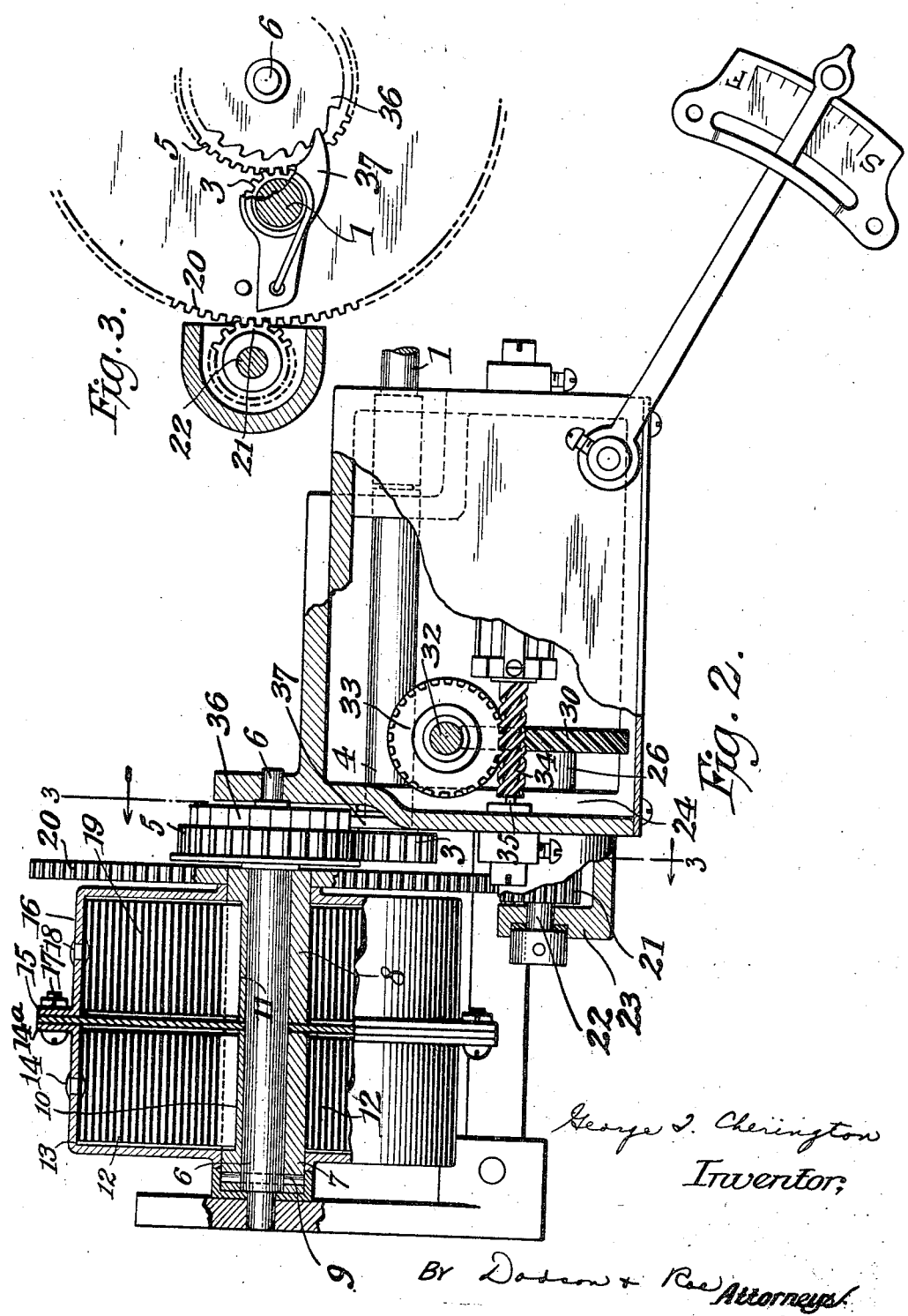

Patented May 8, 1923.

1,454,625

UNITED STATES PATENT OFFICE.

GEORGE T. CHERINGTON, OF WAUKEGAN, ILLINOIS.

GEAR TRAIN FOR PHONOGRAPH MOTORS.

Application filed April 9, 1920. Serial No. 372,566.

*To all whom it may concern:*

Be it known that I, GEORGE T. CHERINGTON, a citizen of the United States, residing at Waukegan, in the county of Lake and State of Illinois, have invented a certain new and useful Improvement in a Gear Train for Phonograph Motors, of which the following is a specification.

My invention relates to that class of motors employing springs for the driving or motive power, and has for its object to provide a gear train which is not only very compact, but which is so constructed that the bearings for the end gear shafts are close to the point where the driving power is applied. In this manner, I not only avoid any possibility of the shaft chattering, but am enabled to produce a very high efficiency and a equietness not obtainable in the gear trains for this purpose with which I am familiar.

My invention has for its object to provide improved means of mounting the fiber intermediate gear, which has always been a source of more or less annoyance and trouble.

My means of accomplishing the foregoing objects may be more readily understood by having reference to the accompanying drawing, which is hereunto annexed and is a part of this specification, in which:

Fig. 1 is a side view partly in section showing my improvement.

Fig. 2 is a top plan view with part of the casing broken away showing the interior construction.

Figs. 3, 4 and 5 are enlarged detail views of parts of the mechanism.

Similar reference numerals refer to similar parts throughout the entire description.

As shown in the drawings, the winding shaft 1, which is preferably provided with a universal joint, has a pinion 3, adjacent its end 4. This pinion is in mesh with a gear 5, mounted upon the spring shaft 6. This shaft has a plurality of sleeves. As shown there are two in number 7 and 8, the outer one of which is fixedly attached to the spring shaft 6, by means of a pin 9 or any other suitable and convenient means of fastening may be employed if desired. The sleeves 7 and 8, are provided with longitudinal slots 10 and 11. A clock spring 12 is coiled about the sleeve 7, its inner end being fitted in the longitudinal slot 10. This spring is surrounded by a casing 13, which is provided with an inwardly extending headed pin, 14, adapted to engage a slot formed in the outer end of the spring 12. The casing 13, is provided with a peripheral flange 14$^a$, which coincides with a flange 15, formed on an adjacent casing 16, the two being secured together by means of screws 17, or in any other suitable or convenient manner.

The casing 16, is also provided with a headed pin 18, which engages the outer end of a spring 19, the inner end of which is engaged by the longitudinal slot 11 in the sleeve 8, which is rotatably mounted upon the spring shaft 6. The sleeve 8, has fixedly attached to it the main driving gear 20. This gear meshes with a pinion 21, mounted upon an intermediate shaft 22. This shaft is journaled in walls 23 and 24, formed in the wall of the casing which encloses the worm gears and the governor. This serves to bring these bearings adjacent the pinion at its point of receiving power from the driving gear 20, thus insuring rigidity, efficiency and quietness. On the intermediate shaft 22, just inside of the gear casing and adjacent the bearing in wall 24, is mounted a hub 26, which is provided with a shoulder as at 27. The hub is secured to the intermediate shaft 22, by means of a pin 28, the ends 29 of which project outwardly therefrom.

The intermediate fiber gear 30 is mounted upon this hub and is provided with slots 31, which are fitted to and coincide with the ends 29, of the pin 28, so that when the gear 30 is forced on to the hub and abuts against the shoulder 27, it is held true by the shoulder and against rotation by the pin.

Practice has demonstrated this to be a most efficient and desirable means for securing a fiber gear in a device of this character. This gear meshes with a worm, formed on the turn table shaft 32. This shaft carries a gear 33, which is adapted to engage a worm 34 cut on the end of the governor shaft 35. The spring shaft 6 is provided with a ratchet wheel 36, mounted upon its end adjacent the gear 5, and is engaged by a spring pressed pawl 37 in the usual and customary manner. It will be obvious from the foregoing description that I have provided a structure which fully accomplishes the objects set forth in this specification.

The operation of the device is as follows: The spring shaft 1, being rotated with a suitable crank handle (not shown) rotates the pinion 3 which in turn causes the gear 5 which is in mesh with it to rotate the spring shaft 6. This rotates the sleeve 7, and serves to wind up the spring 12. When this spring is sufficiently wound, it will commence to rotate the casing 13, and this will carry with it the casing 16, and will in turn operate to wind up the spring 19, in the casing 16. When the brake is released, the spring 19, will rotate the sleeve 8, carrying with it the gear 20. This causes the rotation of the pinion 21, and in turn, since it is fixedly attached to the intermediate shaft 22, rotates the intermediate fiber gear 30, which through the medium of the worm, causes the rotation of the turn table shaft, the gear 33, operating through the medium of the worm 34, to rotate the governor shaft and in turn the governor which regulates the speed at which it moves.

Having described my invention what I regard as new, and desire to secure by Letters Patent is:

1. A drive for phonographs comprising the combination with a winding shaft, of a pinion adjacent one end thereof, a spring shaft, a gear mounted on said spring shaft in mesh with the pinion, a plurality of springs, a gear rotated by the unwinding of said springs, a frame, an intermediate shaft, a pinion mounted thereon, journal bearings in said frame each side of and adjacent to said pinion, a shouldered hub secured to said intermediate shaft by a pin, the ends of which project outwardly, a fiber gear mounted on said hub abutting said shoulder, there being a slot in said gear which fits the projecting end of the pin, a turn table shaft, a worm mounted thereon in mesh with the fiber gear, a governor, and means to cause the rotation of the turn table shaft to rotate the governor.

2. A drive for phonographs comprising the combination with a winding shaft, of a pinion adjacent one end thereof, a spring shaft, a gear mounted on said spring shaft in mesh with the pinion, a plurality of springs, a rotatable sleeve on said spring shaft, a gear secured thereto which is rotated by the unwinding of said springs, a frame, an intermediate shaft, a pinion mounted thereon, journal bearings in said frame each side of and adjacent to said pinion, a shouldered hub secured to said intermediate shaft by a pin, the ends of which project outwardly, a fiber gear mounted on said hub abutting said shoulder, there being a slot in said gear which fits the projecting end of the pin, a turn table shaft, a worm mounted thereon in mesh with the fiber gear, a governor, and means to cause the rotation of the turn table shaft to rotate the governor.

3. A drive for phonographs comprising the combination with a winding shaft, of a pinion adjacent one end thereof, a spring shaft, a ratchet and pawl to prevent the backward rotation of the spring shaft, a gear mounted on said spring shaft in mesh with the pinion, a plurality of springs, a gear rotated by the unwinding of said springs, a frame, an intermediate shaft, a pinion mounted thereon, journal bearings in said frame each side of and adjacent to said pinion, a shouldered hub secured to said intermediate shaft by a pin, the ends of which project outwardly, a fiber gear mounted on said hub abutting said shoulder, there being a slot in said gear which fits the projecting end of the pin, a turn table shaft, a worm mounted thereon in mesh with the fiber gear, a governor, and means to cause the rotation of the turn table shaft to rotate the governor.

4. A drive for phonographs comprising the combination with a winding shaft, of a pinion adjacent one end thereof, a spring shaft, a gear mounted on said spring shaft in mesh with the pinion, a plurality of springs, a gear rotated by the unwinding of said springs, a frame, an intermediate shaft, a pinion mounted thereon, journal bearings in said frame each side of and adjacent to said pinion, a shouldered hub secured to said intermediate shaft by a pin, the ends of which project outwardly, a fiber gear mounted on said hub abutting said shoulder, there being a slot in said gear which fits the projecting end of the pin, a turn table shaft, a worm mounted thereon in mesh with the fiber gear, a governor, means to cause the rotation of the turn table shaft to rotate the governor, and means to prevent the backward rotation of the spring shaft.

In testimony whereof, I have signed the foregoing specification.

GEORGE T. CHERINGTON.